(12) United States Patent
Froeschl et al.

(10) Patent No.: US 12,689,073 B2
(45) Date of Patent: Jul. 21, 2026

(54) METHOD AND DEVICE FOR MONITORING AN ON-BOARD ELECTRICAL SYSTEM OF A VEHICLE

(71) Applicant: Bayerische Motoren Werke Aktiengesellschaft, Munich (DE)

(72) Inventors: Joachim Froeschl, Herrsching (DE); Andreas Heimrath, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 308 days.

(21) Appl. No.: 17/801,306

(22) PCT Filed: Feb. 15, 2021

(86) PCT No.: PCT/EP2021/053662
§ 371 (c)(1),
(2) Date: Aug. 22, 2022

(87) PCT Pub. No.: WO2021/180428
PCT Pub. Date: Sep. 16, 2021

(65) Prior Publication Data
US 2023/0090528 A1 Mar. 23, 2023

(30) Foreign Application Priority Data
Mar. 13, 2020 (DE) ..................... 10 2020 107 003.9

(51) Int. Cl.
*H01M 10/48* (2006.01)
*B60R 16/033* (2006.01)
(Continued)

(52) U.S. Cl.
CPC .......... *H01M 10/48* (2013.01); *G05B 13/027* (2013.01); *G07C 5/0808* (2013.01); *B60R 16/033* (2013.01); *H01M 2220/20* (2013.01)

(58) Field of Classification Search
CPC .............. H01M 10/48; H01M 2220/20; G05B 13/027; G07C 5/0808; B60R 16/033;
(Continued)

(56) References Cited

U.S. PATENT DOCUMENTS

2015/0311736 A1* 10/2015 Park .......................... H02J 7/52
320/103
2019/0217867 A1* 7/2019 Barthlott ............... B60W 40/12
(Continued)

FOREIGN PATENT DOCUMENTS

CN 107895960 A 4/2018
CN 109552079 A 4/2019
(Continued)

OTHER PUBLICATIONS

Translation of Thurimella DE-102018211575-A1 (Year: 2020).*
(Continued)

*Primary Examiner* — Adam R Mott
*Assistant Examiner* — Ricardo I Viscarra
(74) *Attorney, Agent, or Firm* — Crowell & Moring LLP

(57) ABSTRACT

A device monitors an on-board power supply system having different on-board system components and operated by way of a machine-learned power management system. The device includes a reference unit which is designed, for a state of the on-board power supply system and for an action effected on the basis of the state of the power management system, to determine a reference reward which would be produced during operation of a reference on-board system. Furthermore, the device includes a reward unit which is designed, for the state and for the action, to determine an actual reward which is produced during operation of the on-board power supply system. The device further includes a monitoring unit, which is designed to monitor the on-board
(Continued)

power supply system on the basis of the actual reward and on the basis of the reference reward.

11 Claims, 3 Drawing Sheets

(51) Int. Cl.
*G05B 13/02* (2006.01)
*G07C 5/08* (2006.01)

(58) Field of Classification Search
CPC .... B60L 50/60; B60L 2260/46; B60L 3/0023; B60L 58/10; B60L 1/00
See application file for complete search history.

(56) References Cited

U.S. PATENT DOCUMENTS

| | | | |
|---|---|---|---|
| 2019/0258938 A1 | 8/2019 | Mnih et al. | |
| 2019/0347874 A1* | 11/2019 | Mash | G08G 5/55 |
| 2020/0004210 A1* | 1/2020 | Kim | G05B 13/027 |
| 2020/0101865 A1* | 4/2020 | Tsurutani | B60L 58/16 |
| 2020/0320807 A1* | 10/2020 | Gorti | G07C 5/0808 |
| 2022/0032967 A1* | 2/2022 | Golov | B60L 1/00 |
| 2022/0176939 A1* | 6/2022 | Poll | B60W 10/26 |
| 2023/0090528 A1* | 3/2023 | Froeschl | G07C 5/0808 |
| | | | 701/32.8 |
| 2023/0216327 A1* | 7/2023 | Aubin | H02J 7/80 |
| | | | 320/162 |
| 2024/0016675 A1* | 1/2024 | Olson | B60L 3/12 |

FOREIGN PATENT DOCUMENTS

| | | | |
|---|---|---|---|
| CN | 110114783 A | 8/2019 | |
| CN | 110843746 A | 2/2020 | |
| DE | 10 2004 004 280 A1 | 8/2005 | |
| DE | 10 2016 220 561 A1 | 4/2018 | |
| DE | 20 2019 100 641 U1 | 3/2019 | |
| DE | 10 2018 205 797 A1 | 10/2019 | |
| DE | 102018211575 A1 * | 1/2020 | B60L 7/10 |
| WO | WO-2021180428 A1 * | 9/2021 | B60L 1/00 |

OTHER PUBLICATIONS

International Search Report (PCT/ISA/210) issued in PCT Application No. PCT/EP2021/053662 dated May 19, 2021 with English translation (six (6) pages).

German-language Written Opinion (PCT/ISA/237) issued in PCT Application No. PCT/EP2021/053662 dated May 19, 2021 (eight (8) pages).

German-language Search Report issued in German Application No. 10 2020 107 003.9 dated Oct. 22, 2020 with partial English translation (10 pages).

Chinese-language Office Action issued in Chinese Application No. 202180014666.0 dated Mar. 6, 2025 with English translation (15 pages).

* cited by examiner

500

Ascertain a reference reward
for a state-action pair

501

Ascertain an actual reward
for the state-action pair

502

Monitor the on-board energy system on the basis of
the actual reward and the reference reward

503

METHOD AND DEVICE FOR MONITORING AN ON-BOARD ELECTRICAL SYSTEM OF A VEHICLE

BACKGROUND AND SUMMARY

The invention relates to a method and a corresponding device that may be used to monitor the components of an on-board electrical system reliably and efficiently, in particular in order to be able to predict the failure of an on-board system component at an early stage.

A vehicle comprises an on-board electrical (energy) system that may be used to supply multiple electrical loads in the vehicle with electrical energy. The on-board system typically comprises an electrical energy store for storing electrical energy and for backing up the on-board system voltage. In addition, the on-board system typically comprises a generator (e.g. driven by an internal combustion engine of the vehicle) that is configured to generate electrical energy for the on-board system. Furthermore, the on-board system of a hybrid or electric vehicle typically comprises a DC-DC voltage converter (e.g. supplied with power by a traction battery of the vehicle) that is configured to generate, or to provide, electrical energy for the on-board system.

The on-board system may be operated by means of an energy management system. The energy management system may be configured to safeguard the supply of energy to the electrical loads by way of the on-board system. For this purpose, the energy management system may comprise one or more controllers that are configured to regulate one or more controlled variables of the on-board system (such as e.g. the on-board system voltage) to a respective setpoint value.

The energy management system may comprise, or be, a machine-learning-based energy management system. In particular, the energy management system may comprise one or more controllers that have been taught on the basis of machine learning.

Failure of an on-board system component (e.g. the energy store or the generator or the DC-DC voltage converter or a load) of the on-board electrical system can lead to impairment of the operation of a vehicle, which may lead to a safety-critical situation, in particular in the case of a vehicle driving in an automated manner.

The present document is concerned with the technical object of efficiently and precisely predicting future and/or imminent failure of a component of an on-board electrical system.

The object is achieved by each of the independent claims. Advantageous embodiments are described in the dependent claims, inter alia. It is pointed out that additional features of a patent claim dependent on an independent patent claim without the features of the independent patent claim or only in combination with a subset of the features of the independent patent claim may form a dedicated invention that is independent of the combination of all features of the independent patent claim and that may be made the subject of an independent claim, of a divisional application or of a subsequent application. This is applicable in the same way to technical teachings that are described in the description and that may form an invention independent of the features of the independent patent claims.

According to one aspect, a device (also referred to as a diagnosis module in this document) for monitoring an on-board energy system, in particular an on-board energy system of a (motor) vehicle, is described. The on-board energy system comprises different on-board system components, such as e.g. one or more electrical energy stores, one or more electrical loads and/or one or more generators or DC-DC voltage converters (which are configured to provide electrical energy in the on-board energy system from outside).

The on-board energy system is operated on the basis of a machine-learning-based (machine-learning) energy management system, the energy management system having been taught by means of reinforcement learning. In the course of reinforcement learning, an action effected by the energy management system based on a specific state of the on-board energy system may be assigned a particular reward. The reward may be calculated on the basis of a specific reward function, the reward function being dependent on one or more measurable variables, in particular state variables, of the on-board system. The energy management system may be taught in the course of reinforcement learning in such a way that the energy management system is rendered able to effect a particular action, based on a state of the on-board energy system, that makes the cumulated sum of future (possibly discounted) rewards as large as possible, in particular maximizes it.

The state of the on-board energy system may be described by one or more (measurable) state variables. Illustrative state variables are:

- the current and/or the voltage in the on-board system and/or on an on-board system component;
- the state of charge of an energy store; and/or
- the load on a generator and/or on a DC-DC voltage converter and/or on an electrical load.

The energy management system may be designed to ascertain measured values relating to one or more state variables at a specific time. The state of the on-board energy system at the specific time is then obtained from the measured values. The state at the specific time may then be taken as a basis for ascertaining and effecting an action. Illustrative actions are:

- changing (in particular increasing or reducing) the current and/or the voltage in the on-board system and/or on an on-board system component; and/or
- changing (in particular increasing or reducing) the load on a generator and/or on a DC-DC voltage converter and/or on an electrical load.

The energy management system may comprise a taught (by means of reinforcement learning) neural network that receives the measured values of the one or more state variables as input values and that provides the action to be effected as an output value. Alternatively or additionally, the neural network may be designed to provide a Q value (ascertained by means of Q learning) for a pair comprising measured values of the one or more state variables and an action. The Q values for a multiplicity of different possible actions may then be taken as a basis for selecting the action that results in the optimum (e.g. the largest) Q value.

The aforementioned process may be repeated at a sequence of times in order to constantly control and/or regulate the on-board energy system. The particular present state may be measured at each time, and an action (e.g. that results in the particular optimum Q value) may be ascertained on the basis of this.

The energy management system may have been taught for a reference on-board system, the reference on-board system being able to correspond to the on-board energy system with error-free and/or unimpaired on-board system components.

The machine-learning-based energy management system may comprise at least one controller designed to regulate a measurable (state) variable of the on-board energy system to a setpoint value. The reward, or the reward function, that is used for teaching the energy management system (in particular the neural network of the energy management system) may be dependent on a divergence of the (measured) actual value of the measurable variable from the setpoint value during operation of the reference on-board system, or during operation of the on-board energy system. The reward may be all the larger the smaller the divergence of the actual value from the setpoint value. As such, precise setting of one or more state variables of the on-board energy system may be effected.

The device comprises a reference unit configured to ascertain, for a state of the on-board energy system and for an action effected by the energy management system on the basis of the state, a reference reward that would be obtained during operation of the reference on-board system. The reference unit may have been taught in the course of the teaching process for the machine-learning energy management system, in particular on the basis of the rewards that have been obtained for different combinations of states and actions in the course of the teaching process for the machine-learning energy management system.

A reference unit may thus be provided that indicates for a state-action pair the reward that would be obtained during operation of the reference on-board system (with the unimpaired on-board system components). The reference unit may comprise at least one neural network (taught in the course of the teaching process for the energy management system).

The device further comprises a reward unit configured to ascertain, for the state and for the action (i.e. for the state-action pair), an actual reward that is (actually) obtained during operation of the on-board energy system. The actual reward and the reference reward may be ascertained on the basis of the same reward function.

As already explained above, the reward, or the reward function, in particular the actual reward and the reference reward, may be dependent on one or more measurable (state) variables of the on-board system. In particular, the reward, or the reward function, and thus the actual reward and the reference reward, may comprise one or more reward components for the applicable one or more measurable (state) variables of the on-board system.

The reward unit may be configured to ascertain measured values for the one or more measurable (state) variables that are obtained as a result of the effected action during operation of the on-board energy system. The actual reward may then be ascertained on the basis of the measured values for the one or more measurable variables. Accordingly, the rewards may also be ascertained during the teaching of the energy management system and the reference unit (during operation of the reference on-board system).

The device further comprises a monitoring unit configured to monitor the on-board energy system on the basis of the actual reward and on the basis of the reference reward, in particular on the basis of a comparison of the actual reward and the reference reward. The monitoring unit may in particular be configured to take the actual reward and the reference reward as a basis for determining whether or not an on-board system component of the on-board energy system is impaired. In addition, the device may be configured to output advice (e.g. an error message) relating to the on-board system component if it is determined that the on-board system component is impaired.

The device described in this document allows the (actual) reward that is obtained for a state-action pair during operation of the on-board energy system to be compared with the (reference) reward that is obtained for the state-action pair during operation of a corresponding error-free reference on-board system. This may allow efficient and precise monitoring of the on-board energy system. In particular, future and/or imminent failure of an on-board system component may be precisely predicted in this way.

As already explained above, the reference reward and/or the actual reward may each comprise one or more reward components. Illustrative reward components are: a reward component relating to a current and/or relating to a voltage within the on-board system and/or on an on-board system component; a reward component relating to a load and/or relating to a loading of an on-board system component; and/or a reward component relating to a state of charge of an energy store of the on-board system.

Making allowance for different reward components for different on-board system components allows the accuracy of the monitoring of the on-board energy system to be increased further. In particular, a specific on-board system component that is about to fail may be precisely identified.

The monitoring unit may be configured to ascertain a divergence of the actual reward from the reference reward, in particular a divergence of a reward component of the actual reward from a corresponding reward component of the reference reward. The divergence may then be taken as a basis for precisely determining, in particular by way of comparison of the divergence with a divergence threshold value, whether or not an on-board system component is impaired. The divergence threshold value may have been ascertained by way of simulation and/or by way of tests in advance, in particular specifically for a plurality of different on-board system components of the on-board system and/or for an applicable plurality of different reward components.

The actual reward and the reference reward (i.e. in particular the collective reward function) may each comprise a reward component for a specific on-board system component. The monitoring unit may be configured to take the divergence of the reward components of the actual reward and the reference reward for the specific on-board system component as a basis for determining whether or not the specific on-board system component is impaired. A comparison of individual reward components thus allows an impaired on-board system component (that is about to fail) of the on-board energy system to be identified particularly precisely.

According to a further aspect, a (road) motor vehicle (in particular a motor car or a truck or a bus or a motorcycle) that comprises the device described in this document is described.

According to a further aspect, a method for monitoring an on-board energy system that comprises different on-board system components and that is operated on the basis of a machine-learning energy management system is described, the energy management system having been taught for a reference on-board system by means of reinforcement learning. The method comprises ascertaining, for a state of the on-board system and for an action effected by the energy management system on the basis of the state, a reference reward that would be obtained during operation of the reference on-board system. In addition, the method comprises ascertaining, for the state and for the action, an actual reward that is obtained during operation of the on-board energy system. The method further comprises monitoring the on-board energy system on the basis of the actual reward and on the basis of the reference reward, in particular on the basis of a comparison of the actual reward and the reference reward.

According to a further aspect, a software (SW) program is described. The SW program may be configured to be executed on a processor (e.g. on a control unit of a vehicle), and thereby to carry out the method described in this document.

According to a further aspect, a storage medium is described. The storage medium may comprise a SW program configured to be executed on a processor, and thereby to carry out the method described in this document.

It should be noted that the methods, devices and systems described in this document may be used either on their own or in combination with other methods, devices and systems described in this document. In addition, any aspects of the methods, devices and systems that are described in this document may be combined with one another in a wide variety of ways. In particular, the features of the claims may be combined with one another in a wide variety of ways.

The invention is described more thoroughly below on the basis of exemplary embodiments.

DETAILED DESCRIPTION OF THE DRAWINGS

Figure 1A:
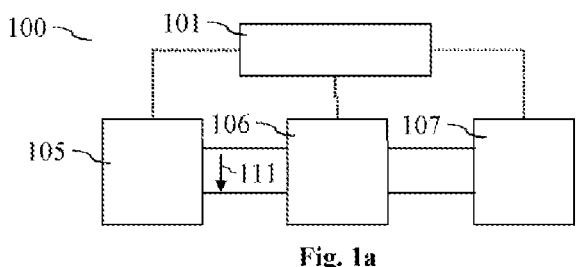
FIG. 1a shows an illustrative on-board electrical system.

As explained at the outset, the present document is concerned with reliably and precisely predicting the state of components of an on-board electrical system of a vehicle. In this regard, FIG. 1 shows a block diagram of an on-board system 100 that comprises an electrical energy store 105 (e.g. a lithium ion battery), one or more electrical loads 106 and/or a generator 107. In addition, the on-board system 100 comprises an energy management system 101 that is configured to set one or more (state) variables of the on-board system 100, in particular to regulate it/them to a respective setpoint value. An illustrative (state) variable of the on-board system 100 is the on-board system voltage 111, which may e.g. be set, in particular regulated, to a specific target value.

Figure 1B:
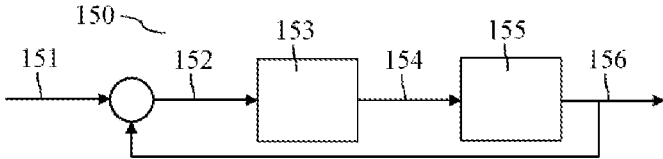
FIG. 1b shows an illustrative control loop.

A controller may be used to set a controlled variable (e.g. the on-board system voltage 111) to a setpoint value (which changes over time). FIG. 1b shows an illustrative control loop 150 in which the controlled variable 156 is set to a setpoint value 151 by means of a controller 153. The controller 153 is configured to take the control error 152 (i.e. the difference) arising from the controlled variable 156 and (the particular present) setpoint value 151 as a basis for ascertaining a manipulated variable 154. One or more actuators of the on-board system 100 (e.g. the generator 107 and/or one or more electrical loads 106) may be operated on the basis of the manipulated variable 154. An illustrative manipulated variable 154 is the speed at which the generator 107 is operated (e.g. by an internal combustion engine of a vehicle). The controlled variable 156 (e.g. the value of a state variable of the on-board system 100) is obtained from the manipulated variable 154 within the controlled system 155, which is dependent on properties of the on-board system 100.

Figure 2A:
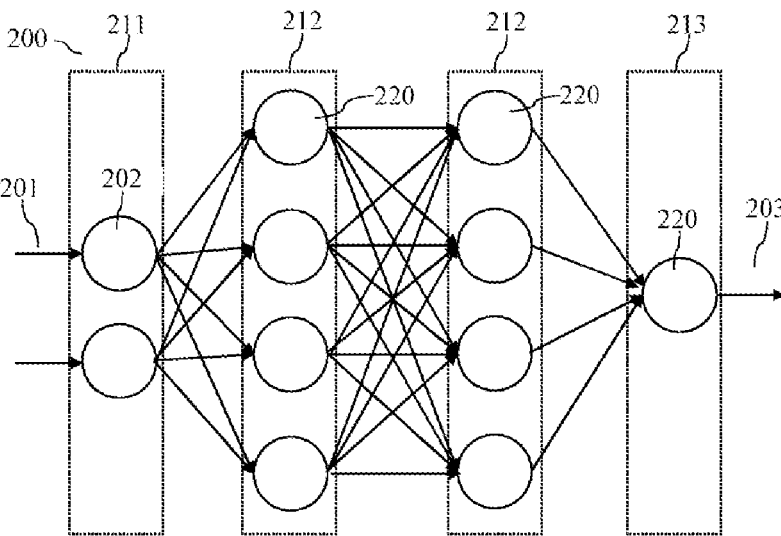
FIG. 2a shows an illustrative neural network.
Figure 2B:
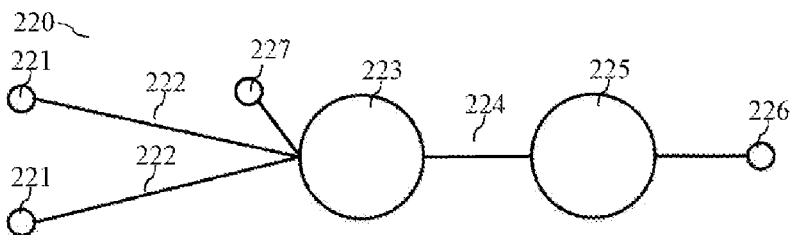
FIG. 2b shows an illustrative neuron.

One option for efficient and flexible setting and/or adjustment of a controller 153 is teaching the controller 153, or teaching a controller function, by means of one or more neural networks. FIGS. 2a and 2b show illustrative components of a neural network 200, in particular of a feedforward network. The network 200 in the example shown comprises two input neurons, or input nodes 202, each of which receives a present value of an input variable as input value 201 at a specific time t. The one or more input nodes 202 are part of an input layer 211.

The neural network 200 further comprises neurons 220 in one or more hidden layers 212 of the neural network 200. Each of the neurons 220 may have the individual output values of the neurons of the preceding layer 212, 211 (or at least a portion thereof) as input values. Processing takes place in each of the neurons 220 in order to ascertain an output value of the neuron 220 on the basis of the input values. The output values of the neurons 220 of the last hidden layer 212 may be processed in an output neuron, or output node 220, of an output layer 213 in order to ascertain the one or more output values 203 of the neural network 200.

FIG. 2b shows the illustrative signal processing within a neuron 220, in particular within the neurons 202 of the one or more hidden layers 212 and/or the output layer 213. The input values 221 of the neuron 220 are weighted with individual weights 222 in order to ascertain a weighted sum 224 of the input values 221 (if necessary in consideration of a bias, or offset 227) in a summing unit 223. An activation function 225 is able to map the weighted sum 224 to an output value 226 of the neuron 220. The activation function 225 may e.g. limit the range of values in this case. E.g. a sigmoid function or a hyperbolic tangent (tanh) function or a rectified linear unit (ReLU), e.g. $f(x)=\max(0,x)$, may be used as the activation function 225 for a neuron 220. If necessary, the value of the weighted sum 224 may be shifted using an offset 227.

A neuron 220 thus has weights 222 and/or possibly an offset 227 as neuron parameters. The neuron parameters of the neurons 220 of a neural network 200 may be taught in a training phase in order to cause the neural network 200 to approximate a specific function and/or to model a specific behavior.

A neural network 200 may be taught e.g. on the basis of the backpropagation algorithm. For this purpose, applicable output values 203 at the output of the one or more output neurons 220 may be ascertained in a first phase of a q-th epoch of a learning algorithm for the input values 201 at the one or more input nodes 202 of the neural network 200. The output values 203 may be taken as a basis for ascertaining the value of an optimization or error function. In the present case, a temporal difference (TD) error may be used as the optimization or error function, as explained later on.

Backpropagation of the error, or of the error value, from the output to the input of the neural network takes place in a second phase of the q-th epoch of the learning algorithm in order to change the neuron parameters of the neurons 220 layer by layer. The ascertained error function at the output may be derived partially after every single neuron parameter of the neural network 200 in order to ascertain an extent and/or a direction for adjusting the individual neuron parameters. This learning algorithm may be repeated iteratively for a multiplicity of epochs until a predefined convergence and/or termination criterion is reached.

By way of example, what is known as (actor-critic) reinforcement learning may be used to teach a controller 153, or a controller function, configured to ascertain the manipulated variable 154 on the basis of the control error 152. As a further example, Q learning may be used. A Q function may be learnt (and e.g. approximated by a neural network 200) in the course of the Q learning, the Q function being able to be used to select an optimum action for a specific state.

Figure 3:
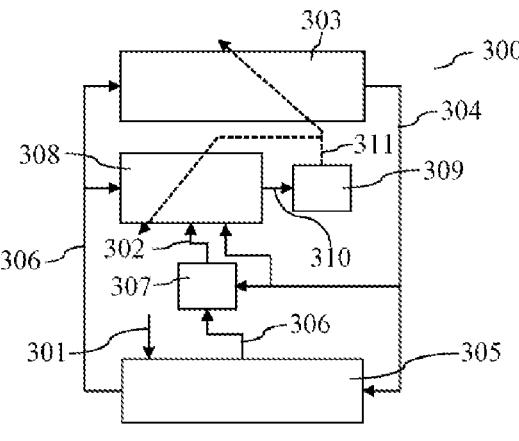
FIG. 3 shows an illustrative device for teaching a controller.

FIG. 3 shows an illustrative device 300 for teaching a controller function 303 for a controller 153, in particular for an energy management system 101. The controller function 303 may e.g. be approximated by a neural network 200. Alternatively or additionally, the controller function 303 may be described by an analytical function with one or more controller parameters. An illustrative controller function is $$u_t = \pi(x_t) = kx_t$$

where k is a vector with one or more controller parameters and where x is the value of a state vector at the time t, with the values of one or more state variables 306 of the state of the on-board system 100. Illustrative state variables 306 are the state of charge of the energy store 105, the on-board system voltage 111, the load of the generator 107, the load of an electrical load 106, etc.

The values of the one or more state variables 306 may indicate the divergence of the individual state variables from a respective setpoint value 301. In this case, the values $x_t$ indicate the values of one or more control errors.

The controller function 303 is referred to as an "actor" in the context of (actor-critic) reinforcement learning. The controller function 303 may be used to take the present values of the one or more state variables 306 as a basis for ascertaining the present values $u_t$ of one or more manipulated, or action, variables, or actions, 304. An illustrative manipulated, or action, variable, or action, 304 is the demanded load of the generator 107 and/or the load produced by a load 106.

The present values $u_t$ of the one or more manipulated, or action, variables 304 may be used to operate the system to be controlled, or the controlled system 305. In particular, one or more components 106, 107 of the on-board system 100 may be operated on the basis of the present values $u_t$ of the one or more manipulated, or action, variables 304. This produces values $x_{t+1}$ of the one or more measurable state variables 306 at a subsequent time t+1.

The value of a value function may be ascertained on the basis of the present values $x_t$ of the one or more measurable state variables 306 and on the basis of the present values $u_t$ of the one or more manipulated, or action, variables 304. The value function may correspond to the discounted sum of (future) rewards. A reward $r(x_t,u_t)$ may be allocated at any time t on the basis of a specific reward function. The reward may be e.g. dependent on how well the state of charge of the energy store 105 is set to a specific target state of charge; and/or how close the load produced by the generator 107 is to a specific target load.

The reward $r(x_t,u_t)$ may have different reward terms, or reward components, for different controlled variables and/or state variables 306. The individual reward components may be combined to produce a reward vector. The present value 302 of the reward $r(x_t,u_t)$ (i.e. of the reward function) at a specific time t may be calculated by the unit 307.

The controller function 303 may be taught in such a way that the sum of the rewards discounted over time is increased, in particular maximized. Since the unknown controlled system 305 means that it is not known how actions, or manipulated variables, 304 have to the values $x_t$ of the one or more (measurable) state variables 306 (i.e. the values of the control errors), the "critic" taught may be a state-action value function 308 that indicates a value $Q^\pi(x_t, u_t)$ 310 of the sum of the rewards discounted over time for each combination of a state $x_t$ of the system 305 to be controlled (i.e. the on-board system 100) and an action $u_t$ 304.

On the other hand, a state value function may be defined, which indicates the sum of the rewards $r(x_t,u_t)$ discounted over time i for a specific state $x_t$:

$$V^\pi(x_t) = \sum_{i=1}^{\infty} \gamma^i r(x_i, u_i)$$

with the discounting factor $\gamma \in [0,1]$. After the value functions have converged, the following may be assumed:

$$V^\pi(x_{t+1}) = Q^\pi(x_{t+1}, u_{t+1})$$

where $u_{t+1} = \pi(x_{t+1})$ with the taught controller function $\pi(\ )$ 303.

The value functions may be taught iteratively over time, and after convergence the following should apply:

$$Q^\pi(x_t, u_t) = r(x_t, u_t) + \gamma V^\pi(x_{t+1})$$

While convergence has not yet been reached, the above equation may be taken as a basis for calculating what is known as a temporal difference (TD) error $\delta$ 311 (e.g. in the unit 309) as:

$$\delta = r(x_t, u_t) + \gamma V^\pi(x_{t+1}) - Q^\pi(x_t, u_t)$$

wherein, assuming:

$$V^\pi(x_{t+1}) = Q^\pi(x_t, u_{t+1})$$

the TD error $\delta$ 311 may be calculated from the value $r(x_t,u_t)$ 302 of the reward at the time t and from the values $Q^\pi(x_t,u_t)$, $Q^\pi(x_{t+1},u_{t+1})$ 310 of the state-action value function 308 at the times t and t+1. The value 302 of the reward may be provided in the unit 309 for this purpose (not shown). The TD error $\delta$ 311 may be used to iteratively teach the state-action value function 308 and if necessary the controller function 303. In particular, the TD error $\delta$ 311 may be used to teach the state-action value function 308. The taught state-action value function 308 may then be used to teach the controller function 303.

The state-action value function 308 may be approximated and/or modeled by a neural network 200, and adjusted on the basis of the TD error $\delta$ 311. After the state-action value function 308 has been adjusted, the controller function 303 may be adjusted. The device 300 may be configured to iteratively adjust the controller function 303 and/or the state-action value function 308 for a multiplicity of times t until a convergence criterion is reached. As such, a controller function 303 may be ascertained for a controller 153 efficiently and precisely.

Accordingly, multiple controllers 153 may be taught for multiple control, or state, variables 106 of a machine-learning-based energy management system 101.

As already explained above, the method described in association with FIG. 3 is only one example of the teaching of an energy management system 101 on the basis of reinforcement learning. Another example is Q learning. In this case, a Q function, or a state-action value function 308, may be taught that is designed to provide a Q value for a state-action pair (the Q value indicating e.g. the sum of the discounted future rewards). Based on a present state, the taught Q function may be used to ascertain applicable Q values for multiple different possible actions. It is then possible to select the action for which the optimum (e.g. the maximum) Q value is obtained.

Figure 4:
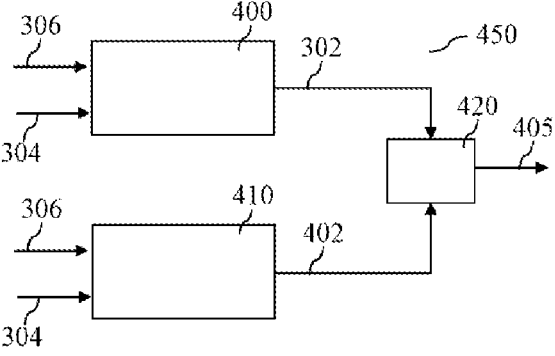
FIG. 4 shows an illustrative device for ascertaining the state of an on-board electrical system of a vehicle.

FIG. 4 shows a device 450 that allows the state of the different components 105, 106, 107 of an on-board system 100 to be monitored, in particular in order to be able to predict failure of a component 105, 106, 107 early on. The device 400 comprises a reference unit 400 that is configured to take the present state $x_t$ 306 of the on-board system 100 and an action $u_t$ 304 effected by the energy management system 101 as a basis for ascertaining the (reference) reward $r(x_t, u_t)$ 302, in particular the (reference) reward vector, that would be obtained if the on-board system 100 were operating perfectly. The reference unit 400 may be taught during the teaching process (of the controllers 153) of the energy management system 101. For this purpose, the reference unit 400 may comprise a neural network 200.

The device 450 further comprises a reward unit 410 that is configured to take the present state $x_t$ 306 of the on-board system 100 and the action $u_t$ 304 effected by the energy management system 101 as a basis for ascertaining the actual reward $r(x_t, u_t)$ 402, in particular the actual reward vector, that is actually obtained during operation of the on-board system 100 (using the reward function).

The reference reward 302 and the actual reward 402 may be compared with one another in a comparison and/or checking unit 420. In particular, the individual vector variables of the reference reward vector may be compared with the corresponding vector variables of the actual reward vector. The comparison may then be taken as a basis for ascertaining the state 405 of the on-board system 100. In particular, the comparison may be taken as a basis for making a prediction about whether a component 105, 106, 107 of the on-board system 100 will fail within a specific future period of time. If necessary, the component 105, 106, 107 that will fail may also be identified.

This document thus describes the diagnosis and/or the failure prediction for components 105, 106, 107 in a vehicle that has machine-learning-based energy management. The energy management system 101 may have been taught e.g. on the basis of reflex-augmented reinforcement learning (RARL) or on the basis of reinforcement learning. RARL is described e.g. in Heimrath et al. "Reflex-Augmented Reinforcement Learning for Operating Strategies in Automotive Electrical Energy Management", Proceeding of the 2019 International Conference on Computing, Electronics & Communications Engineering, IEEE, 2019, pp. 62-67. The content of this document is hereby completely incorporated into the present document by way of reference.

The agent, e.g. a deep neural network 200, learns which actions 304 need to be performed in a specific normal state 306 of the vehicle on-board system 100. An action 304 may comprise e.g. increasing the on-board system voltage 111. After an action 304 has been performed, the state 306 of the on-board system 100 changes and the agent is provided with feedback about the quality of its decision (i.e. of the effected action 304) in the form of the reward (i.e. in the form of a reward 302). This reward 302 is used in the learning process of the energy management system 101. The state of the on-board system 100 may comprise multiple state variables 306, such as e.g. the utilization level of the generator 107, the (normalized) current in or from the energy store 105, the state of charge (in particular the SOC) of the energy store 105, the temperature of the energy store 105, etc.).

This document describes a diagnosis module 450, at least part of which is incorporated into the learning process of the energy management system 101. In particular, the reference unit 400 may be taught during the learning process of the energy management system 101. This renders the diagnosis module 450 able to predict and/or quantify abnormal behavior by and/or the failure of a component 105, 106, 107 of the on-board system 100. The diagnosis module 450 may be designed to (use the reference unit 400 to) predict the expected effect of the performance of an action 304 in the on-board system 100. In addition, the diagnosis module 450 may be designed to compare the expected behavior of the on-board system 100 with the actual behavior of the on-board system 100 (within the comparison and/or checking unit 420).

During the training of the energy management system 101 in a (reference) on-board system 100 with operational components 105, 106, 107, the reference unit 400 (with a separate neural network 200) is taught in parallel therewith and independently. During the training of the energy management system 101, the agent performs an action 304 based on a specific state 306 and receives a reward 302 therefor. This information is used for training the reference unit 400 in order to render the reference unit 400 able to predict the expected effect of the performance of an action 304 in an operational (reference) on-board system 100 as the reward 302.

After the energy management system 101 has been trained and/or when it is in use during a journey in a vehicle, the training of the reference unit 400 is also finished. While the energy management system 101 is operating, the energy management system 101 selects a particular action 304 based on a specific state 306 and performs this action 304. The actually measured variables of the on-board system 100 may then be taken as a basis for ascertaining an actually measured reward 402 (within the reward unit 420).

The reward 302 (of the error-free (reference) on-board system 100) predicted by the reference unit 400 may then be compared with the actual measured reward 402 (of the on-board system 100). The respective rewards 302, 402 may have different reward components that may each be compared in pairs. The comparison of the actually measured reward 402 and the predicted reward 302 indicates whether one or more components 105, 106, 107 of the on-board energy system 100 have an actual behavior that differs from a setpoint behavior.

Tolerances and/or threshold values below which an error situation is detected may be stipulated for the difference in the values of the rewards 302, 402 and/or of the individual reward components. The tolerances and/or threshold values may be ascertained in the course of a simulation and/or on the basis of tests on vehicles (e.g. in the course of development).

If an error is detected on the basis of the comparison of the rewards 302, 402, advice may be output to the driver of the vehicle and/or to a servicing organization to service the vehicle. If necessary, the driver of the vehicle may be prompted to take over driving of the vehicle manually if it is identified that the detected error (e.g. an error in the energy store 105) means that automated driving is no longer possible.

The rewards 302, 402 may be e.g. a function of the battery current to or from the energy store 105 and/or of the utilization level of the generator 107. If for example the rewards 302, 402 are a function of the battery current and if the operational status of the generator 107 is known (e.g. on the basis of the sensor data from a dedicated sensor), the calculated divergence of the predicted reward 302 from the actual reward 402 may be used as a quantitative indicator of the operability of the energy store 105. On the other hand, the divergence in the rewards 402, 402 relating to the utilization level of the generator 107 may be used to infer the operability of the generator 107.

If the reward 302, 402 is a function of the battery current and the generator utilization level, the weighting of the two influencing variables within the reward 302, 402 may be used for interpreting the divergence of the predicted reward 302 from the actual reward 402. In particular, the weights of the individual reward components may be used to decide which on-board system component 105, 106, 107 is impaired.

Figure 5:
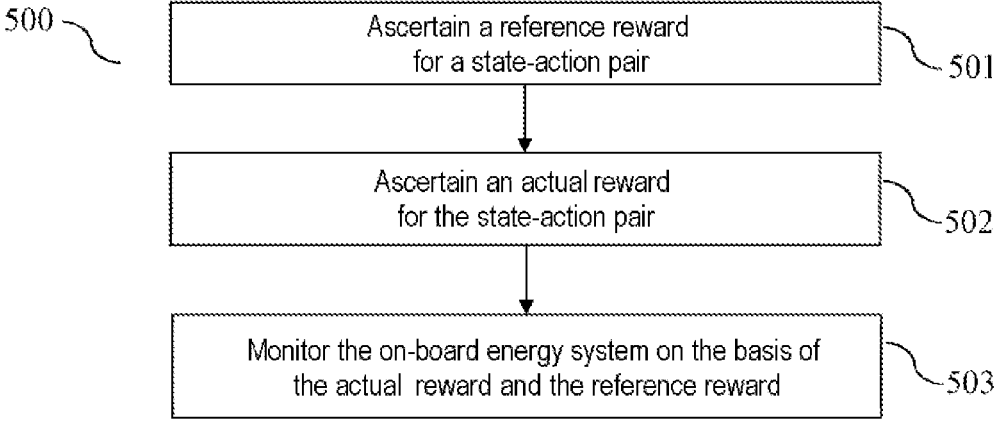
FIG. 5 is a flowchart for an illustrative method for ascertaining the state of an on-board electrical system of a vehicle.

FIG. 5 shows a flowchart for an illustrative (possibly computer-implemented) method 500 for monitoring an on-board energy system 100 (of a motor vehicle) that comprises different on-board system components 105, 106, 107 (e.g. an electrical energy store 105, one or more electrical loads 106 and/or a generator 107) and that is operated on the basis of a machine-learning energy management system 101. The energy management system 101 may have been taught for a reference on-board system by means of reinforcement learning. The reference on-board system may correspond to the on-board energy system 100 if the on-board energy system 100 has exclusively error-free and/or unimpaired on-board system components 105, 106, 107.

The method 500 comprises ascertaining 501, for a state 306 of the on-board system 100 and for an action 304 effected by the energy management system 101 on the basis of the state 306, a reference reward 302 that would be obtained during operation of the reference on-board system. This may involve using a reference unit 400 that is designed to provide the particular reference reward for a state-action pair. The reference unit 400 may have been taught by means of reinforcement learning as well during the teaching of the energy management system 101.

In addition, the method 500 comprises ascertaining 502, for the state 306 and for the action 304, an actual reward 402 that is obtained during operation of the on-board energy system 100. The actual reward 402 may be ascertained on the basis of measured values for one or more measured variables of the on-board energy system 100.

The method 500 further comprises monitoring 503 the on-board energy system 100 on the basis of the actual reward 402 and on the basis of the reference reward 302, in particular on the basis of a comparison of the actual reward 402 and the reference reward 302. During this, in particular the actual reward 402 and the reference reward 302 may be taken as a basis for identifying an impaired on-board system component 105, 106, 107.

The measures described in this document allow the convenience and the safety of an on-board energy system 100 (for a vehicle) to be increased. This may involve making it possible to predict whether the on-board energy system 100 or parts 105, 106, 107 of the on-board energy system 100 no longer meet the demands made of the on-board system 100. It is thus possible for components 105, 106, 107 for which a deterioration is predicted to be repaired or replaced early on before there is a noticeable impairment of the on-board system 100. Furthermore, the measures described may provide a reliable supply of energy for a vehicle driving in an automated manner. In addition, quality variations among the components 105, 106, 107 of an on-board system 100 may be identified.

The present invention is not limited to the exemplary embodiments shown. In particular, it should be noted that the description and the figures are intended only to illustrate the principle of the proposed methods, devices and systems.

The invention claimed is:

1. A device for monitoring an on-board energy system of a vehicle that comprises different on-board system components and that is operated based on a machine-learning energy management system, the machine-learning energy management system having been taught, for a reference on-board system, via reinforcement learning, the device comprising:

one or more processors configured to:

ascertain, for a state of an electrical energy store of the on-board energy system of the vehicle and for an action effected by the electrical energy store of the energy management system of the vehicle on the basis of the state, a reference reward associated with the electrical energy store that would be obtained during operation of the reference on-board system;

ascertain, for the state and for the action, an actual reward associated with the electrical energy store that is obtained during operation of the on-board energy system of the vehicle;

monitor at least the electrical energy store of the on-board energy system of the vehicle on the basis of the actual reward associated with the electrical energy store and on the basis of the reference reward associated with the electrical energy store, including by a comparison of the actual reward and the reference reward;

determine, based on the actual reward associated with the electrical energy store and the reference reward associated with the electrical energy store, whether the electrical energy store is impaired; and output advice relating to the electrical energy store when it is determined that the electrical energy store is impaired;

wherein the one or more processors is configured to learn, in a course of a teaching process for the machine-learning energy management system, on the basis of rewards associated with the electrical energy store that have been obtained for different combinations of states and actions with respect to the electrical energy store in the course of the teaching process for the machine-learning energy management system.

2. The device according to claim 1, wherein:

the reference reward and/or the actual reward each comprise one or more reward components; and the one or more reward components comprise:

a reward component relating to a current and/or relating to a voltage within the on-board energy system and/or on an on-board system component;

a reward component relating to a load and/or relating to a loading of an on-board system component; and/or a reward component relating to a state of charge of the electrical energy store of the on-board energy system.

3. The device according to claim 1, wherein the one or more processors is configured to:

ascertain a divergence of a reward component of the actual reward from a corresponding reward component of the reference reward; and take the divergence as a basis for determining, by way of comparison with a divergence threshold value, whether or not an on-board system component is impaired.

4. The device according to claim 3, wherein:

the actual reward and the reference reward each comprise a reward component for a specific on-board system component; and the one or more processors is configured to take the divergence of the reward components of the actual reward and the reference reward for the specific on-board system component as a basis for determining whether or not the specific on-board system component is impaired.

5. The device according to claim 3, wherein the divergence threshold value has been ascertained by way of simulation and/or by way of tests in advance.

6. The device according to claim 5, wherein the divergence threshold value has been ascertained by way of simulation and/or by way of tests in advance specifically for a plurality of different on-board system components of the on-board energy system and/or for an applicable plurality of different reward components.

7. The device according to claim 1, wherein the actual reward and the reference reward are dependent on one or more measurable variables of the on-board energy system;

the actual reward and the reference reward comprise one or more reward components for the applicable one or more measurable variables of the on-board energy system; and the one or more processors is configured to:

ascertain measured values for the one or more measurable variables that are obtained as a result of the effected action during operation of the on-board energy system; and ascertain the actual reward on the basis of the measured values for the one or more measurable variables.

8. The device according to claim 1, wherein the machine-learning energy management system comprises at least one controller designed to regulate a measurable variable of the on-board energy system to a setpoint value; and the actual reward and the reference reward are dependent on a divergence of an actual value of the measurable variable from the setpoint value during operation of the reference on-board system, or during operation of the on-board energy system.

9. The device according to claim 1, wherein the reference unit comprises at least one neural network.

10. The device according to claim 1, wherein the reference on-board system corresponds to the on-board energy system with error-free and/or unimpaired on-board system components.

11. A computer-implemented method for monitoring an on-board energy system of a vehicle that comprises different on-board system components and that is operated based on a machine-learning energy management system, the machine-learning energy management system having been taught, for a reference on-board system, by way of reinforcement learning; the method comprising:

ascertaining, with one or more controllers of the vehicle, for a state of an electrical energy store of the on-board energy system of the vehicle and for an action effected by the electrical energy store of the energy management system on the basis of the state, a reference reward associated with the electrical energy store that would be obtained during operation of the reference on-board system;

ascertaining, with the one or more controllers of the vehicle, for the state and for the action, an actual reward associated with the electrical energy store that is obtained during operation of the on-board energy system;

monitoring, with the one or more controllers of the vehicle, at least the electrical energy store of the on-board energy system of the vehicle on the basis of the actual reward associated with the electrical store and on the basis of the reference reward associated with the electrical energy store, including by a comparison of the actual reward and the reference reward;

determining, with the one or more controllers of the vehicle, based on the actual reward associated with the electrical energy store and the reference reward associated with the electrical energy store, whether the electrical energy store is impaired; and outputting, with the one or more controllers, advice relating to the electrical energy store when it is determined that the electrical energy store is impaired wherein the one or more controllers learn, in a course of a teaching process for the machine-learning energy management system, on the basis of rewards associated with the electrical energy store that have been obtained for different combinations of states and actions with respect to the electrical energy store in the course of the teaching process for the machine-learning energy management system.

* * * * *